(12) United States Patent
Ohtsu et al.

(10) Patent No.: US 6,309,782 B1
(45) Date of Patent: Oct. 30, 2001

(54) COLOR FILTER AND METHOD FOR MANUFACTURING THE SAME

(75) Inventors: Shigemi Ohtsu; Eiichi Akutsu; Lyong Sun Pu; Motohiko Tsuchiya, all of Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/288,819

(22) Filed: Apr. 9, 1999

Related U.S. Application Data

(63) Continuation-in-part of application No. 09/177,652, filed on Oct. 23, 1998, now abandoned.

(30) Foreign Application Priority Data

Oct. 29, 1997 (JP) .................................................... 9-297466
Apr. 10, 1998 (JP) ................................................ 10-099627
Apr. 23, 1998 (JP) ................................................ 10-113176

(51) Int. Cl.[7] ............................. G02B 5/20; G02F 1/1335
(52) U.S. Cl. ............................... 430/7; 205/91; 205/92; 205/124; 205/157
(58) Field of Search ............................. 430/7; 204/227; 205/91, 92, 124, 157

(56) References Cited

U.S. PATENT DOCUMENTS

| | | | |
|---|---|---|---|
| 4,787,716 | * 11/1988 | Kato et al. | 350/357 |
| 5,205,921 | * 4/1993 | Shirkanzader | 205/318 |
| 5,645,963 | * 7/1997 | Chang | 430/7 |
| 5,916,735 | * 6/1999 | Nakashima et al. | 430/314 |
| 6,025,101 | * 2/2000 | Ohtsu et al. | 430/52 |

FOREIGN PATENT DOCUMENTS

| | | |
|---|---|---|
| 1-246396A | 10/1989 | (JP) . |
| 3-87702A | 4/1991 | (JP) . |
| 3-224661A | 10/1991 | (JP) . |
| 3-263002A | 11/1991 | (JP) . |
| 5-119209 | 5/1993 | (JP) . |
| 5-150112 | 6/1993 | (JP) . |
| 5-157905 | 6/1993 | (JP) . |
| 6-230216 | * 8/1994 | (JP) . |
| 4-104101 | * 7/1997 | (JP) . |

OTHER PUBLICATIONS

English language Abstract of JP 5–119209, May, 1993.*
Yoneyama, Hiroshi et al., "Photoelectrochromic Properties of Polypyrrole–Coated Silicon Electrodes," J. Electrochem. Soc.: Electrochemical Science and Technology, Oct. 1985, pp. 2414–2417.

* cited by examiner

Primary Examiner—John A. McPherson
(74) Attorney, Agent, or Firm—Oliff & Berridge, PLC

(57) ABSTRACT

A method for manufacturing a color filter having a high resolution and excellent controllability, in few steps without using a photolithographic process is disclosed. The method includes: preparing a substrate produced by sequentially forming a transparent electroconductive film and a semiconductor film on a transparent substrate; preparing a water-based liquid in a vessel, the water based liquid containing a coloring material and an electrodeposition material which is chemically dissolved or precipitated/sedimented by changes in the pH; securing the substrate having the transparent electroconductive film, to which means for supplying a current or an electric field according to an image pattern is connected, such that the semiconductor thin film is dipped in the water-based liquid; disposing a counter electrode in the vessel and disposing a mask pattern on the transparent substrate and applying light to selectively precipitate an electrodeposition film, which includes electrodeposition materials, on a portion at which electromotive force was generated with light irradiation, thereby forming a monochromatic color filter. A plurality of coloring materials, which each have a different hue, can be used and the steps for forming a monochromatic color filter can be repeated for each material having a different hue to form a polychromatic color filter.

25 Claims, 7 Drawing Sheets

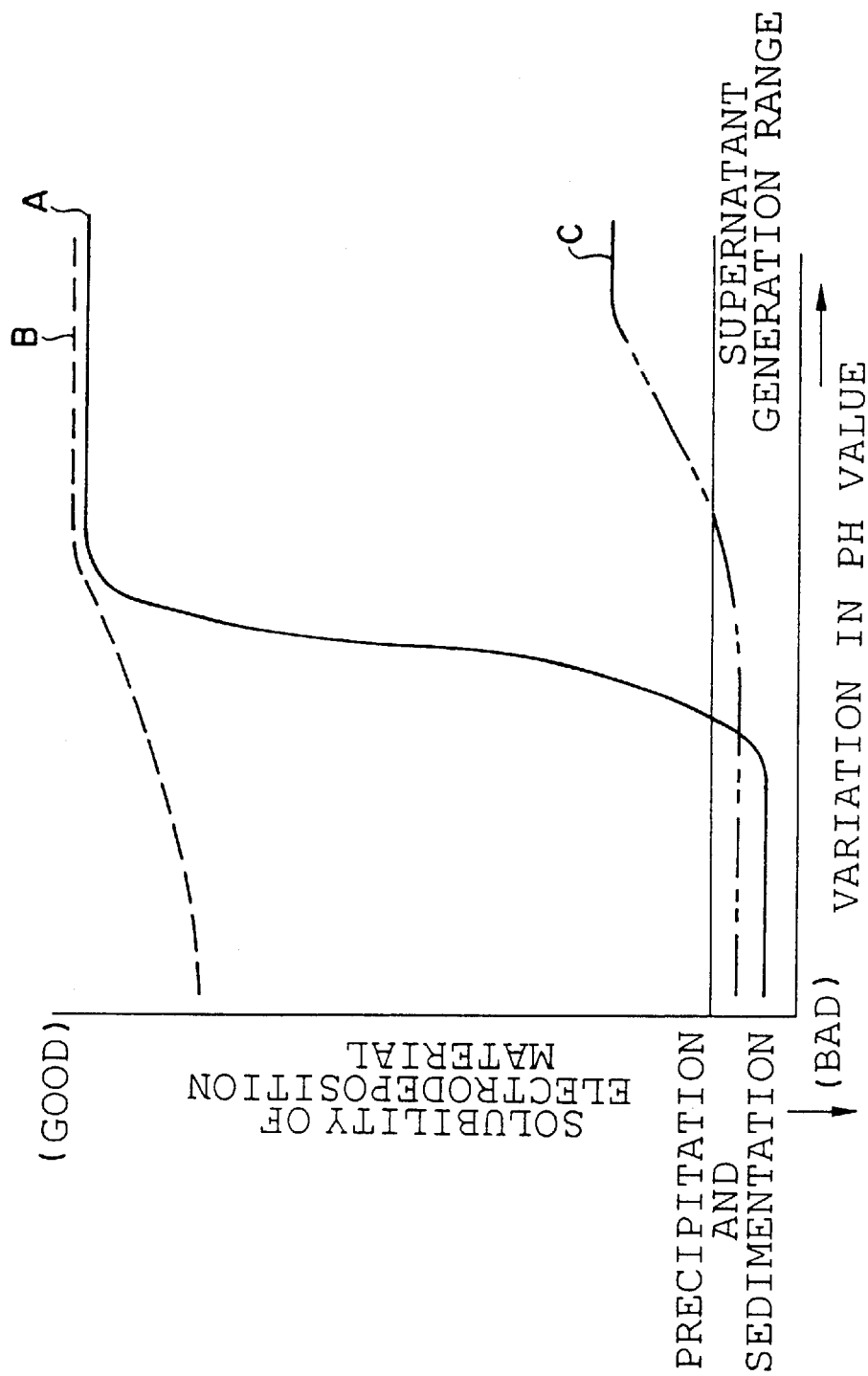

COLOR FILTER AND METHOD FOR MANUFACTURING THE SAME

This is a Continuation-in-Part of application Ser. No. 09/177,652 filed Oct. 23, 1998, now abandoned. The entire disclosure of the prior application(s) is hereby incorporated by reference herein in its entirety.

BACKGROUND OF THE INVENTION

1. Field of the Invention

The present invention relates to a color filter used for color sensors and for various display elements such as a CCD camera and liquid crystal display elements and to a formation technology of the color filter, as well as to a method for manufacturing of a color layer and a black matrix. In particular, the present invention relates to a novel method for manufacturing a color filter in which a color layer and a black matrix with high resolution can be simply formed without using a photolithographic process, to an apparatus used in this method and to a highly smoothed color filter having a transparent semiconductor film therein.

2. Description of the Related Art

Presently known methods for the manufacturing of a color filter include (1) a dyeing method, (2) a pigment dispersion method, (3) a printing method, (4) an ink jet method and (5) an electrodeposition method.

(1) The dyeing method involves forming an aqueous polymer to be dyed on a glass substrate, forming a desired pattern on the substrate through photolithographic steps and in succession dipping the substrate in a dye solution to obtain a colored pattern. These processes are repeated three times to obtain R. G. and B. (Red, Green and Blue) color filter layers. The resulting color filter has high transmittance and a great variety of hues and reaches a high technological level of perfection. Therefore, recently, this method has been used very often in making color solid charge coupled devices (CCD). However, the resulting color filter has deteriorated light resistance because a dye is used and this method involves many manufacturing steps. Hence, recently, the pigment dispersion method has been used instead of the dyeing method especially for making liquid crystal display elements (LCD).

(2) The pigment dispersion method has recently been the dominant method for manufacturing color filters. First, a resin layer is formed in which a pigment is dispersed on a glass substrate. A pattern is formed on the substrate thorough photolithographic steps. This procedure is repeated three times to obtain R. G. and B. color filter layers. This manufacturing method, while attaining a high level of technological perfection, requires many manufacturing steps and hence entails high cost.

(3) The printing method involves dispersing a pigment in a heat-curable resin and repeating printing three times to paint separately with R. G. and B., followed by heating to cure the resin, thereby preparing color filter layers. This method, while requiring no photolithographic steps, gives rise to a problem in terms of resolution and uniform film thickness.

(4) The ink jet method involves forming an ink acceptable layer of an aqueous polymer on a substrate and performing hydrophilic and hydrophobic treatments of the ink acceptable layer, followed by spraying ink using an ink jet method on a portion which has been made hydrophilic, painting separately with R. G. and B., thereby preparing color filter layers. This method also requires no photolithographic steps in the formation of R. G. and B. layers. However, it imparts inferior resolution. It is also inferior in positional accuracy because small droplets of ink scatter when spraying on an adjacent filter layer, with a high probability of color mixture.

(5) The electrodeposition method involves applying a voltage about as high as 70 V onto. a transparent electrode that has been patterned in advance, in an electrolyte wherein a pigment is dispersed in an aqueous polymer, to form an electrodeposition film and thereby perform electrodeposition coating. These processes are repeated three times to obtain R. G. and B. color filter layers. This method, however, requires forming a pattern in advance on a transparent electrode by means of photolithography, and using this transparent electrode as the electrode for electrodeposition. The shape of the pattern on the electrode is limited. Therefore, this method cannot be used for a TFT liquid crystal.

The present inventors have studied such an electrodeposition technology itself based on its principle and as a result, have perceived that there are, among aqueous color molecules, those which exhibit greatly different solubilities in water under different conditions, namely, oxidation conditions, neutral conditions and reduction conditions.

Examples of compounds having such properties are as follows. At a pH of 4 or more, Rose Bengale and eosin, which are fluorescein type dyes, are in a reduction condition so are soluble in water, but, below pH 4, these compounds are in a neutral condition so these compounds precipitate/sediment. It is also known that dye materials having a carboxyl group greatly vary in solubility according to the hydrogen ion concentration (pH), even without any structural changes. Specifically, ink jet dyes that are improved in water resistance are soluble in water at a pH of 6 or more, but precipitate below this pH. When these dyes are dissolved in pure water and an electrode is dipped in the solution to apply voltage, electrodeposition films consisting of these dye molecules are formed on the anode. An aqueous acrylic resin, which has a carboxyl group and is a type of polymer, is also soluble in water at a pH 6 or more, but precipitates below that pH. When an electrode is dipped in a solution, in which a pigment is dispersedin this polymer, to apply voltage, the pigment and the polymer precipitate on the anode to form an electrodeposition film wherein the pigment is mixed with the polymer. These electrodeposition films can be resulted in aqueous solutions by applying reverse voltage or by dipping these films in aqueous solutions whose pH is between 10 and 12. An oxazine type basic dye Cathilon Pure Blue 5GH (C.I. Basic Blue 3), which is a quinoneimine dye, and a thiazine type basic dye Methylene Blue (C.I. Basic Blue 9) are oxidized to develop a color at a pH of 10 or less, but a above this pH, are reduced, becoming insoluble and thereby precipitatig. When these dyes are dissolved in pure water and electrodes are dipped in the solution to apply voltage, electrodeposition films consisting of these dye molecules are formed on the cathodes. These dye electrodeposition films are restored to their original states and resulted by applying reverse voltage or by dipping these films in aqueous solutions whose pH is 8 or less.

In conventional electrodeposition technologies, the voltage required for forming an electrodeposition film is about as high as 70 V. Applying such a high voltage causes a Schottky barrier between a semiconductor and an electrolyte to be broken, with the result that no image can be formed. In addition, there have not been any semiconductors that can be used for forming transparent and practical color filters. In view of this situation, the patterning of a transparent electrode is required in the aforementioned conventional method for the manufacturing of a color filter that makes use of electrodeposition coating. This causes the pattern of color filters to be limited in shape.

There are methods proposed in which a dye is used for doping or dedoping of electroconductive polymers to form an image using light. In this case, it is possible to form an electroconductive film using only a dye without using an electroconductive polymer. However, the voltage required for forming an electrodeposition film using only a dye is larger than that in the case of using an electroconductive polymer as well. Meanwhile, the photovoltaic force is in order of about 0.6 V even in common Si. The photovoltaic force alone is insufficient to form an image. Accordingly, it is possible to consider applying bias voltage to raise the power. However, the Schottky barrier between a semiconductor and a solution, which is necessary for the creation of the photovoltaic force, is broken above a fixed voltage (the voltage is dependent on the bandgap of the semiconductor used). This limits applicable bias voltage. Therefore, the formation of an image in an aqueous solution using photovoltaic force is limited to using a photopolymerization reaction of an electroconductive polymer such as polypyrrole which is oxidized and reduced at 1.0 V or below. Also, the electrodeposition voltage is as high as 20 to 80 V and the oxidizing and reducing reaction of a polymer is utilized for the formation of an electrodeposition material according to the disclosures of Japanese Patent Application Laid-Open (JP-A) No. 5-119209 (entitled "METHOD FOR PRODUCING COLOR FILTER AND ELECTRODEPOSITION SUBSTRATE FOR PRODUCING COLOR FILTER") and JP-A No. 5-157905 (entitled "METHOD FOR PRODUCING COLOR FILTER"), which are well-known in this field. As is clear from the above, the voltage required for the electrodeposition of polymers generally known as a material for electrodeposition coating is greater than or equal to 10 V. To form an image, the photoconductive characteristics of, for example, $ZnO_2$, which is used for electrophotography, are utilized. A practical material that is usable in a water-type solution and that can be handled with ease has not been found as of yet.

A color filter of only a color filter layer is scarcely used. Those in which each of the gaps between pixels is covered with a black matrix are used in general. For the formation of the black matrix, a photolithographic method is usually used. This is one of the primary causes of increased costs. In consideration of the structure, which includes R. G. and B. layers and the black matrix, a method has not yet been found which can produce a color filter having high resolution and high controllability and which requires no photolithographic steps and is reduced in the number of manufacturing steps. For instance, it is well-known that a large part of the costs for a liquid crystal color display device and the like is occupied by the cost of the color filter. This is largely due to low yield in the manufacturing of color filters with the result of high cost.

Among the color filters produced by each of the above-mentioned methods (1) to (5), those produced by the methods (1), (2), and (5), which use a photolithographic method, have irregularities formed on the substrate and on the color filter layer, which is formed by photolithography. Those produced by the methods (3) and (4) in which printing technologies are applied have irregularities on the surface of the ink layer. All these methods pose the problem of impaired surface smoothness. Even if a simple protective layer is formed on the surface, such a protective layer has a thickness insufficient to counteract the influence of the irregularities. If a smoothing treatment is not carried out, ideal smoothness cannot be achieved.

SUMMARY OF THE INVENTION

An object of the present invention is to provide a method for manufacturing a color filter having high resolution and high controllability through a small number of manufacturing steps without using a photolithographic method. Another object of the present invention is to provide a simple method for manufacturing a color filter, the method being capable of coping with even a fine and complex arrangement of pixels and of easily forming a black matrix, and ensuring mass production, and also to provide a manufacturing apparatus used in this method. A further object of the present invention is to provide a color filter having a transparent semiconductor film therein, the color filter being highly applicable and capable of coping with a fine and complex arrangement of pixels and having excellent surface smoothness.

In order to attain the above objects, the present inventors reexamined electrodeposition technology itself based on its principles. As to the aforementioned molecule whose solubility in water greatly varies, the present inventors studied the properties of the molecule in detail. Phase changes in terms of dissolution and precipitation/sedimentation which are based on variations in the solubility of the molecule can be made either by direct electrochemical oxidation and reduction of the molecule or by changing the pH of an aqueous solution in which the molecule is dissolved. Materials which are of an electrochemically phase-variable type are hereinafter optionally called an "electrodeposition material". A method for manufacturing a color filter comprises the steps of:

preparing a substrate produced by forming an organic semiconductor film or an inorganic semiconductor film on a transparent electroconductive film formed on a transparent substrate;

preparing a water-type liquid in a vessel capable of holding a liquid, the water-type liquid containing a coloring material and an electrodeposition material which is chemically dissolved or precipitated/sedimented based on changes in the pH;

disposing, in the vessel, an apparatus having a counter electrode which is the other of a pair of electrodes and securing the substrate, in which means capable of providing a current or an electric field is connected to the transparent electroconductive film, such that a semiconductor thin film is dipped in the water-type liquid; and applying light on a transparent substrate of the substrate to selectively precipitate an electrodeposition film which contains the electrodeposition material on a point at which electromotive force was generated with light irradiation, thereby forming a monochromatic color filter.

According to this method, when the electrodeposition materials are dissolved and dispersed in the water-type liquid and the electrode is dipped in the water-type liquid to apply voltage, an electrodeposition film consisting of these electrodeposition materials is produced on the anode. In a case where the electrodeposition materials are colorless or hypochromic polymer materials, when a coloring material such as a pigment is dispersed in a polymer and an electrode is dipped in a solution to apply voltage, the polymer precipitates on the anode in a condition wherein it contains the coloring material, whereby a colored electrodeposition film in which the pigment and the polymer are mixed is formed. In a case where the electrodeposition material itself is a colored substance, a colored electrodeposition film is formed without adding any coloring material. In this case, adding a coloring material in particular is not necessary. In the present invention, the "electrodeposition material which is chemically dissolved or precipitated/sedimented by changes in the type of coloring material and in pH" definitively includes electrodeposition materials consisting of dyes that can themselves act as the coloring material. These electrodeposition films can be resulted in an aqueous solution either by applying reverse voltage or by dipping these films in an aqueous solution with a pH value imparting high solubility (pH 10–13 for anionic electrodeposition materials and pH 1–4 for cationic electrodeposition materials).

In the present invention, the "water-type liquid" is a generic name for water solutions or water-type dispersion solutions in which all or part of the electrodeposition material (dyes, pigments, polymer compounds, and the like) is dissolved or dispersed in a water-type medium.

A threshold voltage greater than or equal to a fixed voltage is required for formation of the above-mentioned electrodeposition film. This means that: even if current flows, an electrodeposition film is not necessarily formed. If bias voltage is applied, an image can be formed even if the voltage level inputted from an exterior portion is low. It is therefore possible to form an optional electrodeposition film on a desired position if a transparent semiconductor layer is formed on a substrate which will be subjected to electrodeposition, and light is used as its input signals. Such an electrodeposition film formed in this manner is hereinafter called a "photo-electrodeposition film".

Here, the sum of the electromotive force generated by light, with which the semiconductor layer is irradiated, and the bias voltage applied to the transparent electrode may enable the electrodeposition material to be formed into an electrodeposition film. The applied bias voltage may be optionally adjusted according to the photovoltaic force. For example, when the photovoltaic force of the semiconductor is large enough to form an electrodeposition film, the bias voltage to be applied to the transparent electrode may be omitted.

The manufacturing technology for a color filter utilizing a photo-electrodeposition film, which is proposed by the present inventors, is based on the aforementioned findings. An outline of this image formation method is as follows: an organic or inorganic transparent semiconductor is utilized as a substrate and this substrate is irradiated with light thereby precipitating an electrodeposition material, which contains (or combines) a coloring material of an aqueous solution, in the form of a color electrodeposition film, on the semiconductor substrate to form an image. Therefore a transparent electroconductive film that has been patterned in advance, which is required in methods for the manufacturing of a color filter according to conventional electrodeposition methods, is unnecessary. An optional image pattern can be formed without photolithographic steps.

The polychromatic color filter layer according to the present invention can beformed with the following procedure. First, a transparent semiconductor thin film is formed on a transparent electrode. In an electrodeposition solution containing material for manufacturing a color filter, bias voltage is applied to the transparent electrode while light is irradiated to produce photovoltaic force thereby changing the pH in the vicinity of the substrate. Specifically, an electrodeposition thin film is selectively formed on a portion exposed to light by utilizing the variation in the solubility of polymers or color molecules with a variation in the pH. These steps are repeated a plurality of times to form a polychromatic color filter layer. For example, using red (R.), green (G.) and blue (B., materials as the coloring material, the above steps are repeated three times to produce a full-color color filter.

According to the method for the manufacturing of the color filter of the present invention, a photo-electrodeposition film with a high resolution can be formed by utilizing a Schottky junction between the transparent semiconductor thin film and the electrodeposition solution, or a pn junction or a pin junction of the transparent semiconductor thin film itself.

The application of the method for the manufacturing of a color filter according to the present invention enables a black matrix to be simply formed as follows. After the color filter is made, voltage is applied to the substrate in an electrodeposition solution containing material for forming the black matrix (at this time, light may be either present or absent). Because the electric resistance of the color filter layer that has been already formed is high, the black matrix containing the electrodeposition material is selectively formed only on an area on which the color filter layer has not been formed, by controlling the applied voltage. It is noted that the manufacturing method of the black matrix is not limited to those utilizing electrodeposition and that the black matrix may also be formed using a UV-ray-curable resin.

The color filter of the present invention comprises a transparent electroconductive layer, a transparent organic semiconductor layer or an inorganic semiconductor layer and a colored electrodeposition film layer formed from electrodeposition materials containing a polymer which is chemically dissolved or precipitated/sedimented by changes in the type of coloring material and in pH, which are sequentially laminated on a transparent substrate. A plurality of colored electrodeposition film layers of the same structure as the above electrodeposition film layer, which each possess a different hue, may be disposed to make a polychromatic color filter. In addition to the color filter layer, a black matrix may be provided.

This color filter is formed by using electrodeposition materials and preferably by utilizing photovoltaic force. Hence the resulting color filter has an extremely smooth surface and excellent surface characteristics. Since the substrate has the semiconductor layer, and the like, an electronic device can be formed directly on the surface of the color filter. Thus the color filter of the present invention has an advantage of a wide range of applications.

BRIEF DESCRIPTION OF THE DRAWINGS

FIG. 2 is a graph showing a dissolution characteristic of an electrodeposition material as the pH varies.

DETAILED DESCRIPTION OF INVENTION

Figure 1A:
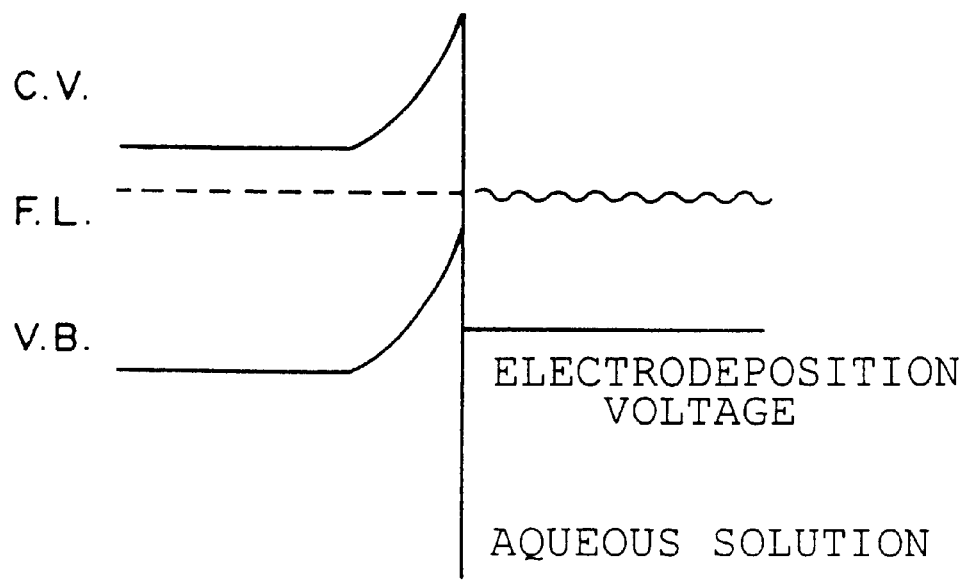
FIG. 1(A) is a schematic diagram showing a Schottky junction.

The present invention will be explained in detail.

First, a molecule (electrodeposition material) is essential which varies in solubility with variation in pH, e.g. alkaline and acidic and the like, and with electrochemical variation, whereby it is, dissolved or precipitated/deposited. The electrodeposition material may be the dye itself. Alternatively, if a transparent polymer is of such a nature that it is precipitated in an alkaline or acidic condition, a coloring material may be dispersed together with such a polymer and used. When the coloring material dispersed in a polymer is used, pigments as well as dyes may be used as the coloring material. For color filters used in positions requiring high light resistance, it is desirable to use a material in which a pigment is dispersed in an aqueous polymer.

Examples of compounds having such characteristics wherein phase changes, specifically dissolution or separation/precipitation, are caused by changes in electrochemical conditions, are as follows. Examples of the dye materials include Rose Bengale and eosin, which are fluorescein type dyes. At a pH of 4 or more, these compounds are in a reduction condition so are soluble in water, but, below pH 4, they are oxidized to be in a neutral condition and so precipitate/sediment. Examples of the dye materials include dye materials having a carboxyl group (specifically, ink jet dyes which are improved in water resistance and are soluble in water at a pH of 6 or more, but precipitate below that pH) which greatly vary in solubility according to the hydrogen ion concentration (pH) even without any structural changes. Examples of the polymer material include specific aqueous acrylic resins which have a carboxyl group and are a type of polymer. These compounds are also soluble in water at a pH of 6 or more, but precipitate below this pH. In addition to the above compounds, an oxazine type basic dye Cathilon Pure Blue 5GH (C.I. Basic Blue 3), which is a quinoneimine dye, and a thiazine type basic dye Methylene Blue (C.I. Basic Blue 9) are oxidized at a pH of 10 or below to develop a color, but are reduced above this pH to be made insoluble, thereby precipitating. When these dyes are dissolved in pure water and electrodes are dipped in the solutions to apply voltage, electrodeposition films consisting of these dyes molecules are formed on the cathodes. These dye electrodeposition films are restored to their original states and resulted by applying reverse voltage or by dipping these films in aqueous solutions whose pH is 8 or less.

These materials, which are of an electrochemically phase-variable type, are hereafter called "electrodeposition materials" as is suit-able. When the electrodeposition materials are dissolved in pure water and electrodes are dipped in the solutions to apply voltage, electrodeposition films consisting of these electrodeposition materials are produced on the anodes. In a case wherein the electrodeposition material itself is a colored substance, a colored electrodeposition film is formed without adding any coloring material. In a case wherein the electrodeposition materials are colorless or are hypochromic polymer materials, when a pigment is dispersed in this polymer and an electrode is dipped in the solution to apply voltage, the pigment and the polymer precipitate on the anode to form an electrodeposition film wherein the pigment and the polymer are mixed. These electrodeposition films can be reeluted in aqueous solutions either by applying reverse voltage or by dipping these films in aqueous solutions with a pH value imparting high solubility (pH 10–13 for anionic electrodeposition materials and pH 1–4 for cationic electrodeposition materials).

A threshold voltage greater than a fixed voltage is required for formation of the above-mentioned electrodeposition film. This means that even if current flows, an electrodeposition film is not necessarily formed. If bias voltage is applied, an image can be formed even if the level of voltage input from the outside is low. It is therefore possible to form an optional electrodeposition film at a desired position if a semiconductor layer which will be subjected to electrodeposition is used as a substrate and light is used as input signals. Such an electrodeposition film formed in this manner is hereinafter called "photo-electrodeposition film".

Taking the case of Pro Jet Fast Yellow 2 manufactured by Zeneka Co., Ltd., which is an acidic dye wherein the dye itself has the capability of forming an electrodeposition film, an example of compounds capable of forming such a photo-electrodeposition film will be explained. This dye can be dissolved in pure water (pH 6–8) with ease and exists as an anion in an aqueous solution, but it becomes insoluble and precipitates above pH 6. When a platinum electrode is dipped in an aqueous solution of this Pro Jet Fast Yellow 2 and is energized, OH ions in the aqueous solution in the vicinity of the anode are consumed and are converted into $O_2$ and hydrogen ions increase, resulting in reduced pH. This is because the following reaction wherein holes (p) and OH ions are combined occurs in the vicinity of the anode.

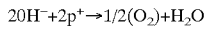

$$2OH^- + 2p^+ \rightarrow 1/2(O_2) + H_2O$$

A fixed voltage is required to cause this reaction. As the reaction progresses, the hydrogen ion concentration in the aqueous solution increases and hence the pH decreases. Therefore, when a voltage greater than a fixed voltage is applied, Pro Jet Fast Yellow 2 at the anode side decreases in solubility and becomes insoluble, forming a thin film.

The present invention utilizes the photovoltaic force produced by irradiating a semiconductor with light to obtain this fixed threshold voltage. Such attempts utilizing photovoltaic force have been made in various studies until the present time. For instance, Fujishima et al carry out electro dialysis of water by irradiating, with light, $TiO_2$, which is an n-type semiconductor (see A Fujishima, K. Honda, Nature Vol. 238, p37, (1972)). Also, in relation to research on photoelectrochromism, Yoneyama et al report an instance in which an Si substrate is irradiated with light to polymerize pyrrole electrochemically, followed by doping and dedoping to form an image (see J. Electrochem. Soc., p2414, (1985)). Also, the present inventors applied previously for a patent on a method for forming an image with light using a dye for the doping and developing of an electroconductive polymer.

On the other hand, an electrodeposition film can be formed using only a dye without using an electroconductive polymer. However, the voltage required for forming an electrodeposition film using only a dye is larger than that in the case of jointly using an electroconductive polymer. Meanwhile, the photovoltaic force is at most 0.6 V in Si. The photovoltaic force alone is insufficient to form an image. Accordingly, it is possible to consider applying a bias voltage to raise the voltage. However, the Schottky barrier between a semiconductor and a solution, which is necessary for the creation of the photovoltaic force, is broken above a fixed voltage (the voltage is dependent on the bandgap of the semiconductor used). This limits applicable bias voltage. Therefore, the formation of an image in an aqueous solution by utilizing the oxidation and reduction of a material, which are conducted using photovoltaic force, is limited to using a photopolymerization reaction of an electroconductive polymer, such as polypyrrole, which is oxidized and reduced at 1.0 V or below.

However, the present inventors utilize the variation in solubility of the above molecule caused by variation in the pH. Therefore, a colored polymer layer can be formed at low voltages and a colored image can be formed by utilizing an electrodeposition film produced by photovoltaic force created with various semiconductors. Namely, the method of the present invention makes it possible to form a colored film of the color filter.

As the transparent polymer electrodeposition material, it is desirable to use the following specific copolymers in view of their precipitation characteristic and the retentivity of the formed electrodeposition film. These specific copolymers contain both a hydrophobic group and a hydrophilic group in a molecule and have an acid value between 30 and 600, wherein the proportion of the number of the hydrophobic groups monomer units which constitute the polymer is in a range from 40% to 80% based on the total number of the hydrophilic and hydrophobic groups, and 50% or more of the hydrophilic groups, have a characteristic wherein they can be reversibly changed to hydrophobic groups by changing the pH. If such a copolymer is used together with coloring material microparticles, a color layer having excellent light resistance can be formed. As the electrodeposition material, a compound having, in its molecule, a unit which is precipitated/deposited by changing the pH, as well as a coloring material unit, can also be used as previously mentioned.

Next, the substrate of the color filter of the present invention will be explained. In the present invention, the substrate must be transparent, since the color filter is formed by means of photovoltaic force. A glass substrate which can be suitably used as a substrate of a semiconductor is therefore preferable. The substrate may be flexible plastic or resin film such as a polyamide film, polyimide film or the like. A transparent electroconductive layer is first formed on the glass substrate. As this electroconductive layer, a well-known electroconductive layer may be optionally used. For example, a common ITO film may be formed.

On this transparent electroconductive layer is formed a transparent organic or inorganic semiconductor layer. As a compound for this semiconductor layer, titanium oxide is preferable. Titanium oxide only absorbs light having wavelengths lower than 400 nm and is transparent, and so can be used as the substrate for making the color filter as is. Recently, n-type semiconductors of titanium oxide possessing excellent characteristics have been produced using various methods such as a sol/gel method, sputtering method or electron-beam deposition method.

$TiO_2$, which is a favorable transparent semiconductor, will now be explained. $TiO_2$ is a transparent oxide semiconductor and creates photo-electroconductive force with UV-ray radiation. If UV-rays are applied to the back face of the substrate, a photo-electrodeposition film can be formed on the transparent substrate. Several methods for forming a film of the $TiO_2$ are known. For example, a thermal oxidation film method, sputtering method, electron-beam method (EB method), and sol/gel method are all well-known. The present inventors made a film of the $TiO_2$ using an EB method and a sol/gel method. However, with a general film formation method, efficiency was low and hence the photocurrent required for electrodeposition did not flow. Thus, a reduction process was carried out to raise the conversion efficiency of the photocurrent. This reduction process is generally performed with heating at 550° C. in a hydrogen atmosphere. For example, Y. Hamasaki et al perform this process under heating at 550° C. in hydrogen gas for about one hour as disclosed in J. Electrochem. Soc. Vol. 141, Node 3, p660, 1994, However, the present inventors succeeded in obtaining a sufficient effect with a process performed at temperatures as low as about 360° C., for a. time as short as 10 minutes. This was achieved by heating while flowing a nitrogen gas containing 3% of hydrogen at a flow rate of 1 liter per minute.

As a semiconductor film applicable to the substrate for the color filter of the present invention, basically any substrate may be used as far as it is a transparent thin film substrate and it produces electromotive force with light irradiation. Specifically, examples of the organic semiconductor that can be used as a transparent semiconductor include polyvinylcarbazole and polyacetylene and examples of the inorganic semiconductor include Ga-N, diamond, C-BN, SiC, ZnSe, $TiO_2$, and ZnO. Examples of the semiconductor include an n-type semiconductor and a p-type semiconductor; however, either type of semiconductor may be used in the present invention. Semiconductors having a laminated structure utilizing a pn junction or a pin junction are more desirable because photocurrent sufficiently flows to produce electromotive force reliably, thereby improving the contrast.

Figure 1B:
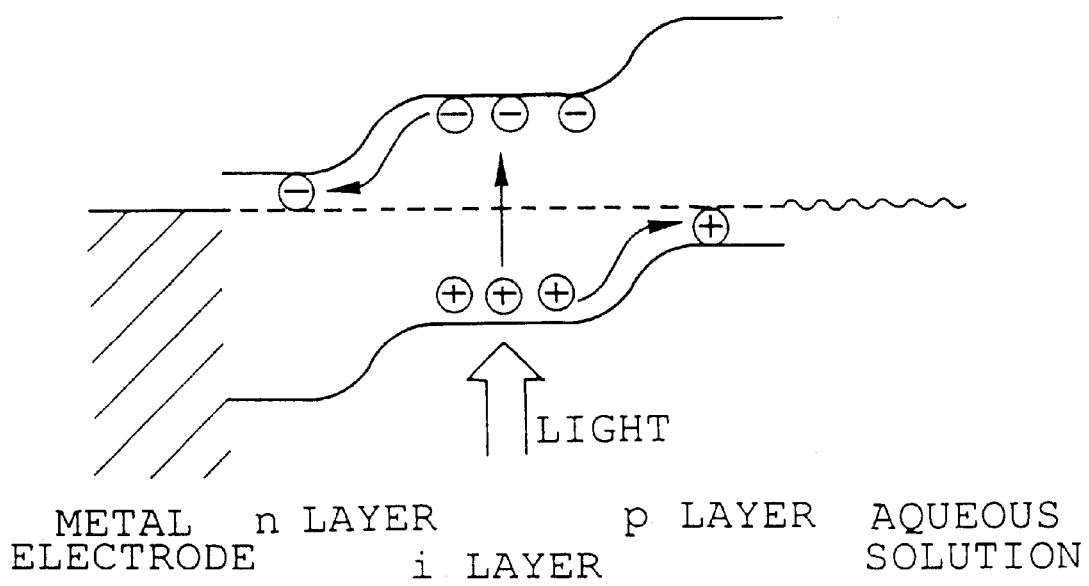
FIG. 1(B) is a schematic diagram showing an energy band in a case of a pin junction.

The combination of the semiconductor with the material capable of forming the electrodeposition film is determined based upon the polarity of the semiconductor. In the formation of electromotive force, a Schottky barrier created at the boundary that is in contact with the semiconductor, a pn junction or a pin junction are utilized, as is known in the case of a solar battery. Taking the case of an n-type semiconductor, an instance of the above combination will be explained with reference to the schematic diagram of FIGS. 1(A) and 1(B). FIGS. 1(A) and 1(B) show the cases of the Schottky junction and the pin junction, respectively. In a case where there is a Schottky barrier interposed between an n-type semiconductor and the solution, the semiconductor is forward biased so that current flows when the semiconductor is negatively polarized, but does not flow when the semiconductor is positively polarized. However, even when the semiconductor is electrically positive so that current does not flow, light irradiation causes electron-hole pairs to generate and the holes to move to the side of the solution so that current flows. In this case, the material to be electro-deposited must be a negative ion as the semiconductor electrode is positively charged. Accordingly, only a combination of an n-type semiconductor and an a nionic molecule is allowed. Conversely, with a p-type semiconductor, a cation is electro-deposited.

In general, the photovoltaic force of the semiconductor is at most 0.6 V even in the case of Si creating a relatively large photovoltaic force. There are limitations on material which can be electro-deposited at 0.6 V. It is therefore necessary to supplement the voltage shortage by applying bias voltage. The bias voltage can be applied up to an upper limit at which the Schottky barrier can be maintained. If the Schottky barrier is broken, current flows through an area which is not irradiated with light and an electrodeposition film is formed on the entire area of the semiconductor substrate. This makes it impossible to form an image. In the case of using a material which can be electro-deposited at, for example, 2.0 V, when a bias voltage of 1.5 V is applied and the substrate is irradiated with light, the 0.6 V photovoltaic force of the semiconductor is added to the bias voltage. This adds up to a total of 2.1 V, which exceeds the threshold voltage required for electrodeposition. Thus an electrodeposition film is formed only on an area irradiated with light.

FIG. 2 illustrates the dissolution characteristic of an electrodeposition material as the pH varies, to provide a standard for the selection of a material (electrodeposition material) capable of forming this electrodeposition film. FIG. 2 is a graph showing the relation between the dissolution characteristics of various materials and the pH of a solution. There are, among the materials, those which rapidly precipitate beyond a certain of pH limit as shown by the curve A (shown by the solid line), those having good solubility independent of the pH as shown by the curve B (shown by the dotted line) and those which are insoluble independent of the pH as shown by the curve C (shown by the dashed line). These characteristics also vary based on the relation between the material and a solvent (dispersion medium) to be used. In the present invention, materials which rapidly precipitate beyond a certain pH limit, as shown by the curve A, are desirable. Materials having the so-called hysteresis curve of the curve A, which shows such a dissolution characteristic, that they are not rapidly re-dissolved by a change in the pH and are maintained for a fixed period of time in a separated condition are ideal from the standpoint of the stability of the formed image. It is therefore desirable to select a combination of a solvent and an electrodeposition material having such characteristics.

Examples of the ionic molecule utilized in the manufacturing of the color filter of the present invention include anionic and cationic molecules. Any well-known ionic molecule may be used insofar as it varies in solubility as the pH varies as described above. Typical examples of the ionic molecule include compounds such as a triphenylmethane phthalide type, phenoxazine type, phenothiazine type, fluoran type, indolylphthalide type, spiropyran type, azaphthalide type, diphenylmethane type, chromenopyrazol type, leucoauramine type, azomethine type, rhodaminelactal type, naphtholactam type, triazene type, triazole azo type, thiazole azo type, azo type, oxazine type, thiazine type, benzthiazole azo type, and quinoneimine type.

These electrodeposition materials may be used either singly or in combinations of two or more. For example, they may be used in combinations of various mixtures such as (1) mixtures of molecules having the same polarities such as mixtures of two or more anionic molecule, or mixtures of two or more cationic molecules, (2) mixtures of molecules having different polarities such as mixtures of an anionic molecule and a cationic molecule, (3) mixtures of dyes and pigments, and (4) mixtures of high polymers and pigments. When two or more compounds each have a different hue, a mixed color can be obtained. In the case of a mixture, it is necessary to include at least one substance having such a nature that it independently varies in solubility as the pH varies to form a thin film. A combination including this substance ensures that even if a material which cannot independently form a thin film is used, this material is incorporated into the material having a film-forming capability, the electrodeposition films are formed, and a mixed color can be obtained.

For example, at a pH of 4 or more, Rose Eengale and eosin, which are fluorescein type dyes, are in a reduction condition so are soluble in water, but below this pH, these compounds are oxidized to be in a neutral condition ard so precipitate. Similarly, diazo type Pro Jet Fast Yellow 2 and some types of aqueous acrylic resins are soluble in water at a pH of 6 or more, but precipitate below this pH. When these molecules are dissolved in pure water and an electrode is dipped in the solution to apply voltage, electrodeposition films consisting of these molecules are formed on the anode. These electrodeposition films can be reeluted in the aqueous solutions by applying reverse voltage or by dipping these films in aqueous solutions having a pH between 10 and 12. Rose Bengale, eosin, and Pro Jet Fast Yellow 2 are materials that can independently form the electrodeposition film. However, when these materials are mixed with a dye material without the capabilityof forming an electrodeposition film, an electrodeposition film of a mixed color can be obtained. In this case, the dye material to be mixed can be either ionic or nonionic. Further, dye materials having different polarities may be jointly used depending on the characteristics of the materials to be combined.

The case of mixing two types of ion will now be considered. In general, when a basic solution and an acidic solution are mixed, a mixture is neutralized to produce a precipitate of another material such as a complex, which precipitates. Thus, when two materials are mixed to develop a mixed color, generally a pigment without a polarity is used, or amaterial having the same polarity is dispersed. However, certain combinations of dyes prevent a complex from being formed; these dyes are allowed to be in a condition wherein their ions coexist. In this case, even if a basic solution and an acidic solution are mixed, production of a precipitate can be prevented. This means that even combinations of ions having different polarities can be used. The present inventors investigated the case where two color ions were mixed making use of such a characteristic.

First, when two ions having the same polarities, for example, Rose Bengale (red), which is anionic and capable of forming an electrodeposition film, and Brilliant Blue (blue), which is likewise anionic but incapable of forming an electrodeposition film, are electrochemically oxidized in a mixed solution in which the above two compounds are mixed, an electrodeposition film of the same violet color as the mixed solution is formed on the electrode. This is because the film is formed in a condition wherein an ion of Brilliant Blue is incorporated into Rose Bengale, which has a capability of forming an electrodeposition film. In this way, when two ions having the same polarities are mixed, it is only necessary that either one of the ions possesses a capability of forming an electrodepositi.on film.

Figure 3:
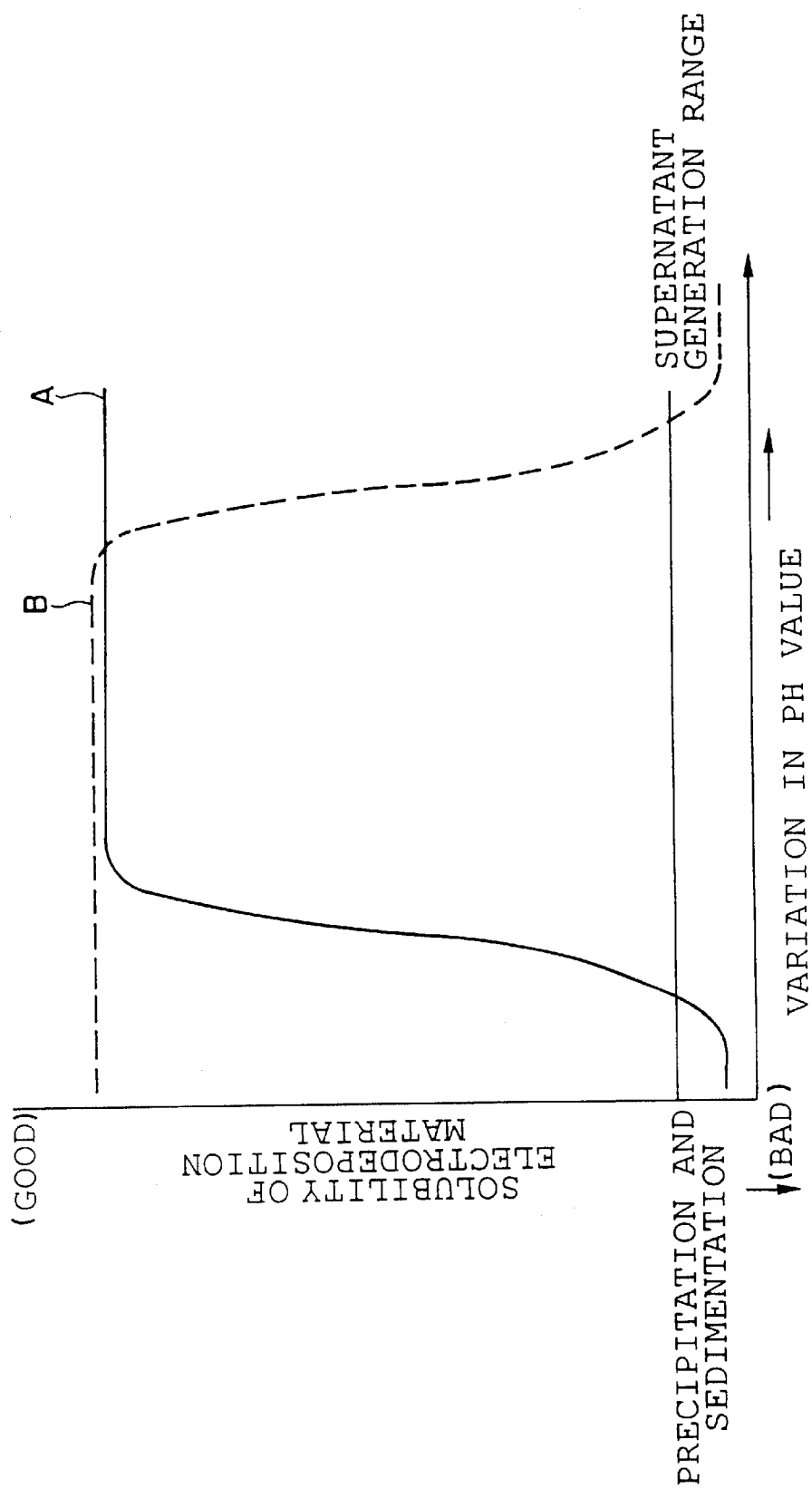
FIG. 3 is a graph showing the dissolution-pH characteristics of two electrodeposition materials that exhibit different polarities and can be jointly used.

Next, when two ions having different polarities, for example, Pro Jet Fast Yellow 2 (Yellow), which is anionic and capable of forming an electrodeposit,ion film, and Cathilon Pure Blue 5GH (blue), which is cationic and capable of form ing an electrodeposition, are electrohemically oxidized in a mixed solution in which the aiove two compounds are mixed, an electrodeposition film of the same green color as the mixed solution is formed on the electrode. Conversely, when the mixed solution is electrochemically reduced, a blue electrodeposition film of only Cathilon Pure Blue 5GH is formed on the electrode. The characteristics of these kinds of ionic compounds will be explained. For example, as shown by the graph in FIG. 3, in a case wherein one compound dissolves in a neutral range and rapidly precipitates at a certain low pH as illustrated by the curve A (shown by the solid line), and another compound dissolves in a neutral range and rapidly precipitates at a certain high pH as illustrated by the curve B (shown by the dotted line), these two compounds can be jointly used because these compounds maintain high solubility in a neutral range and at a specific pH, make phase changes, namely, from a dissolution condition to a precipitation condition and vice versa. If an electrochemical reaction is carried out in a mixed solution of an anionic dye solution and a cationic dye solution when the dyes have such characteristics as mentioned above, electrodeposition films of different dyes can be formed on the same electrode simply by altering the polarity of the applied voltage.

In a case of using a pigment as the coloring material, the pigment may be combined with a transparent or hypochromic polymer material that can be electrodeposited, for example, an aqueous acrylic resin or an aqueous styrene resin, and be dispersed in an aqueous solution. Then, when the electrodeposition material likewise forms an electrodeposition film, a colored electrodeposition film containing the pigment is obtained.

Figure 4:
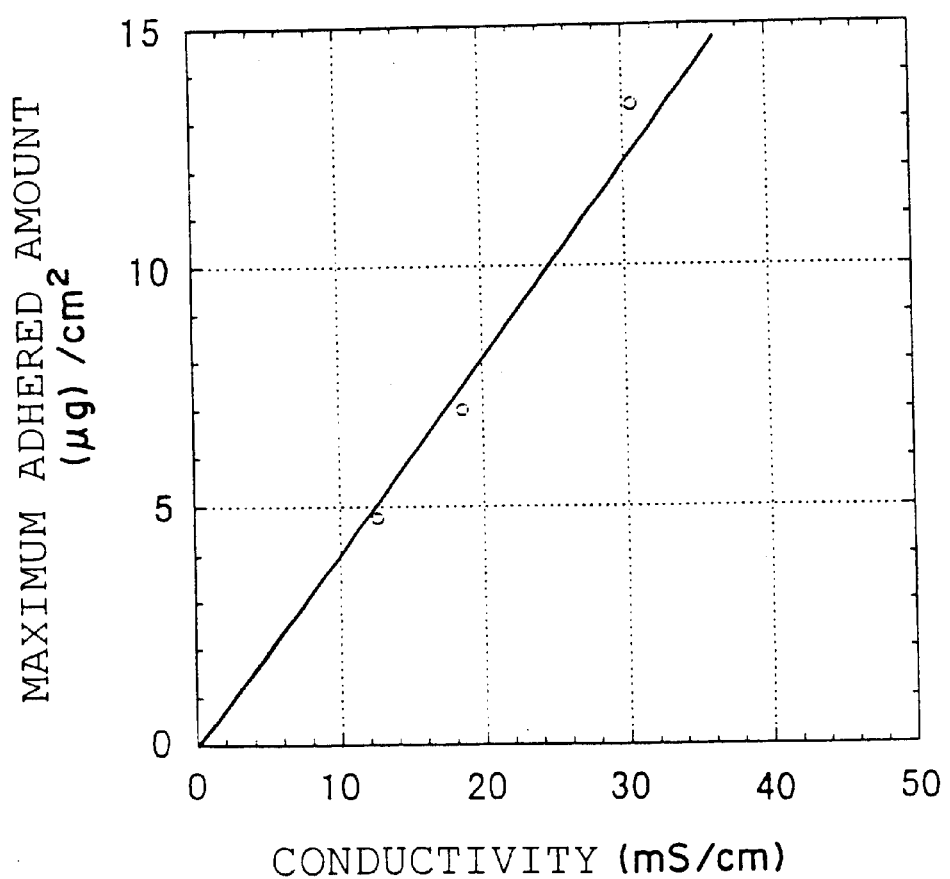
FIG. 4 is a graph showing variation in the relative amount of electrodeposition as the electroconductivity varies.

Next, the electroconductivity and the pH of the solution will be explained. According to the results of the experiments carried out by the present inventors, the electroconductivity relate to the speed of electrodeposition, namely, the amount of electrodeposition. The thickness of the electrodeposition film during a fixed period of time increases as the electroconductivity increases, and plateaus at an electroconductivity of about 100 mS/cm$^2$. Accordingly, (see FIG. 4), when the electroconductivity of the dye ion alone is insufficient, the speed of electrodeposition can be controlled by addition of an acidic or alkaline substance that does not affect the electrodeposition characteristics, for example, an $Na^+$ ion or a $Cl^-$ ion. An electrodeposition film can be formed even by applying a voltage of, for example, 5 V or less.

The pH of the aqueous solution, it is needless to say, also has an influence on the formation of the electrodeposition film. For example, if an electrodeposition film is formed under conditions wherein the solubility of the dye molecule reaches saturation point before the electrodeposition film is formed, the film redissolves with difficulty after being formed. However, when the formation of an electrodeposition film is carried out at a pH of the solution in an unsaturated condition, even if the electrodeposition film is formed, the film starts to redissolve once the electricity goes off. It is therefore desirable to form the electrodeposition film at such a pH of the solution that the solubility saturates.

The method for the manufacturing of the color filter of the present invention will be explained with reference to FIGS. 5(A) to 5(E). First, a transparent electroconductive film 14 is formed on a transparent substrate 12 such as those previously mentioned (FIG. 5(A)) and a semiconductor thin film 16 is formed on the transparent electroconductive film 14 to prepare a substrate 18 (FIG. 5(B)).

Figure 6:
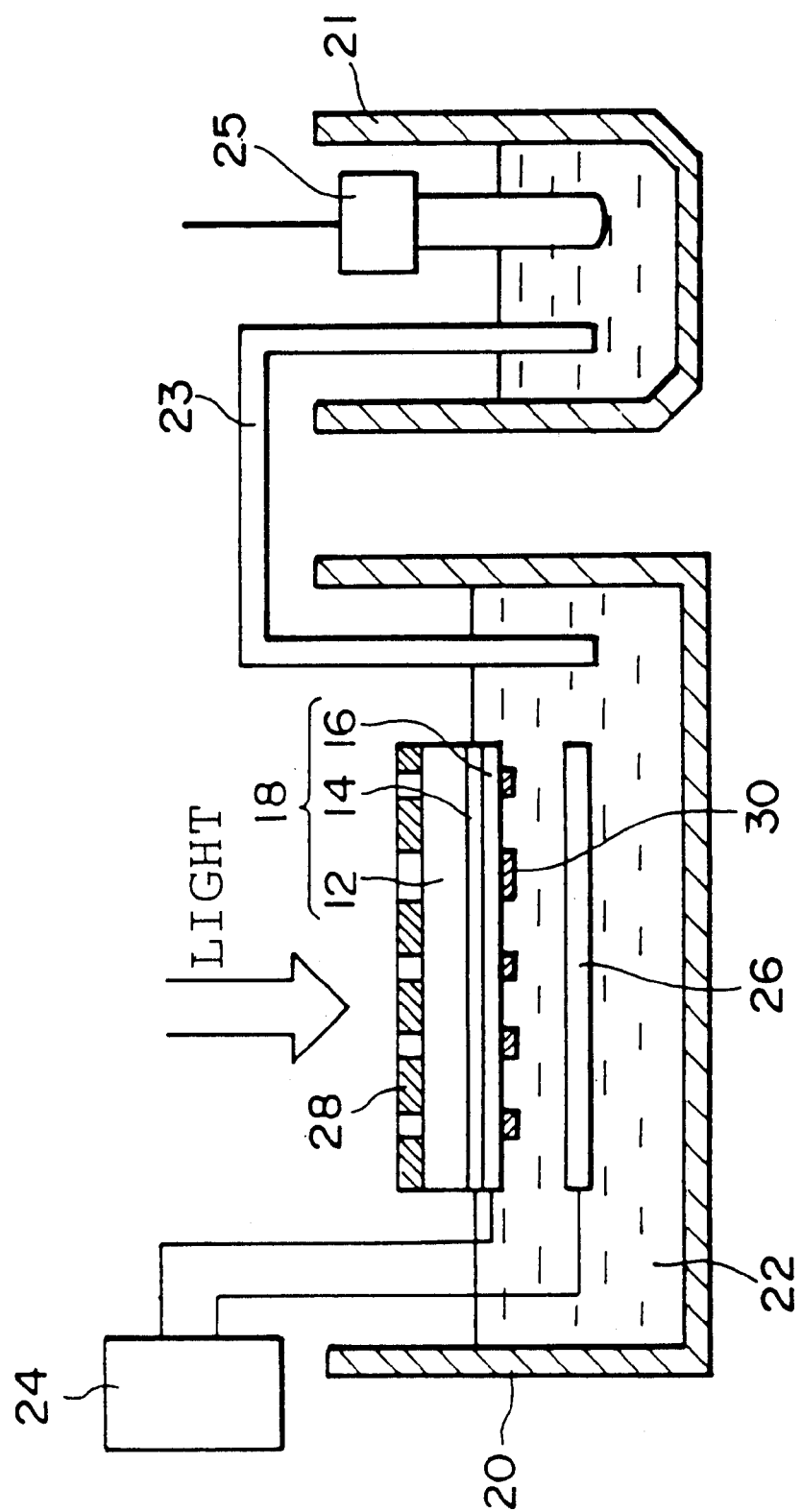
FIG. 6 is a schematic structural view of an apparatus used in the manufacturing of a color filter.

Next, using an apparatus with an arrangement of a triple-pole type, which is commonly used in the electrochemical field, as shown in FIG. 6, a vessel 20 capable of holding a liquid is filled with a water-type liquid 22 containing a coloring material and an electrodeposition material which is chemically dissolved or precipitated/sedimented by a change in pH. The substrate 18 with the transparent electroconductive film 14, to which a means 24 capable of supplying a current or an electric field according to an image pattern is connected, is secured in the vessel 20 such that the semiconductor thin film (electrode) 16 is dipped in the water-type liquid 22. A counter electrode 26, which is the other of a pair of electrodes, is likewise disposed in the vessel 20. A saturated calomel electrode 25 is disposed in a vessel 21 filled with a saturated aqueous potassium solution as a standard liquid interface. A salt bridge 23 is formed between the above-mentioned vessel 20 which contains the electrodeposition material, and the vessel 21. In this case, a $TiO_2$ electrode 16 is utilized as a working electrode with respect to the saturated calomel electrode 25.

A prescribed mask pattern 28 is disposed on the transparent substrate 12 of the substrate 18 and the transparent substrate 12 is irradiated with light through the mask pattern 28. A colored electrodeposition film 30 containing the electrodeposition material and the coloring material is selectively deposited on a portion at which photovoltaic force is generated by light irradiation. The colored electrodeposition film 30 constitutes a color layer of a monochromatic color filter. The substrate 18 on which the colored electrodeposition film is formed is taken out from the water-type liquid 22 and a solvent is removed to stabilize the color layer 30. In this case, the portion at which photovoltaic force is generated is defined by disposing the mask pattern 28. However, photovoltaic force can be generated with light irradiation at a prescribed position by directly writing on the substrate using a laser light, without using the mask pattern 28.

Figure 5A:
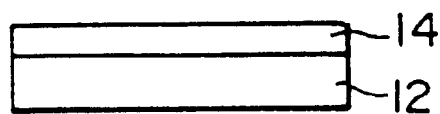
FIGS. 5(A) to 5(F) are schematic sectional views showing a manufacturing process of a color filter.
Figure 5B:
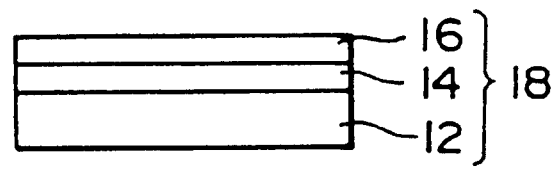
Figure 5C:
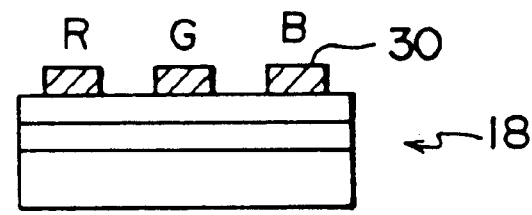

At this time, the hue of the coloring material is altered to, for example, red (R.), green (G.) and blue (B.), and the above steps (the steps for forming a monochromatic filter) are repeated thereby easily forming a polychromatic color filter simply by changing the water-type liquid 22 and the mask pattern 28 and performing the same steps (FIG. 5(C). Further, a black matrix layer 32 is formed (FIG. 5(D)) and a protective layer 34 is formed as desired to produce a polychromatic color filter comprising a semiconductor film 16 in the substrate 18 (FIG. 5(E)).

The potentials of the saturated calomel electrode at 20° C., 25° C., and 30° C. are 0.2444 V, 0.2412 V, and 0.23878 V, respectively, substantially the same as the ground potential (=0 V). In the formation of an image, the saturated calomel electrode is not used, but the vessel (electrolyte) can be used instead by grounding the vessel. In order to clarify the potential of the working electrode (electrode on the side of precipitation), the potential of the surface of the electrolyte may be designed to be the standard potential of the saturated calomel electrode by connecting the electrolyte to the saturated calomel electrode as previously mentioned.

Next, an exposure apparatus for the formation of a photo-electrodeposition film will be explained. Since it is necessary to carry out exposure of the color filter from the backface and through a mask pattern, the wavelength of a source for exposure must be sensitive to the transparent semiconductor. Specifically, it is necessary to carry out exposure using a source whose wavelength is 400 nm or less. In general, a mercury lamp, mercury xenon Lamp, He-Cd laser, $N_2$ laser, or excimer laser is suitably used.

Next, a method for the manufacturing of a black matrix will be explained. General methods that are conventionally known for the manufacturing of the black matrix include a method in which a black matrix is formed in the same manner as in the manufacturing of a color filter and a method in which, using a UV-ray curable resin, a black matrix is formed only a portion on which the color filters has not been formed. However, in order to achieve perfect shielding, various measures are required. This causes an increase in the cost of the color filter. On the contrary, when the color filter layer is formed by the photo-electrodeposition method in accordance with to the present invention, the semiconductor is exposed in an area where a photo-electrodeposition film has not been formed. An electrodeposition film for the black matrix can be formed on this area with ease. Further, in general the formed electrodeposition film is an organic thin film and has high insulating properties. Hence, it is rather difficult to laminate in addition a photo-electrodeposition film on the color filter layer that has been formed. Therefore, if voltage is applied in an electrolyte for the black matrix after the color filter layer has been formed using the photo-electrodeposition method (at this time, since light may be either present or not, exposure is not required in particular), the electrodeposition film of the black matrix is formed so that it completely covers the area on which the color filter layer has not been formed. In this manner, the black matrix can be formed simply and at low cost by utilizing the photo-electrodeposition film. Using the same operation, the electrodeposition film can be completely formed on the area on which the color filter layer has not been formed even in a case of using a UV-ray curable resin. Therefore, a UV-ray curable resin may be used instead of forming the electrodeposition film. In a case of forming the color filter layer using a highly electroconductive material, the electrodeposition film may be further laminated. Further lamination is useful when color filter layers having a different function are formed. However, in a case of forming a black matrix with the aforementioned method, it is necessary to pay attention to conditions of applying voltage and the like.

On the color filter layer and the black matrix formed in the above manner, a protective layer may be provided to improve smoothness and durability. The protective layer may be formed using a resin material such as an acrylic resin, polyimide resin, or polyester resin.

Figure 5D:
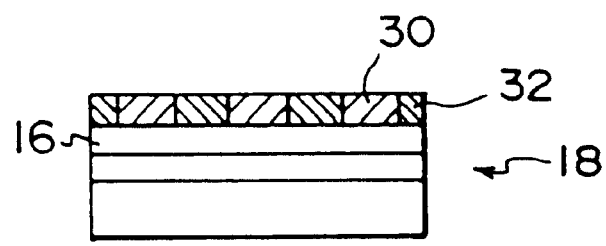
Figure 5E:
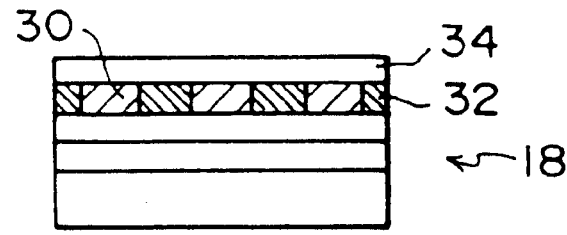
Figure 5F:
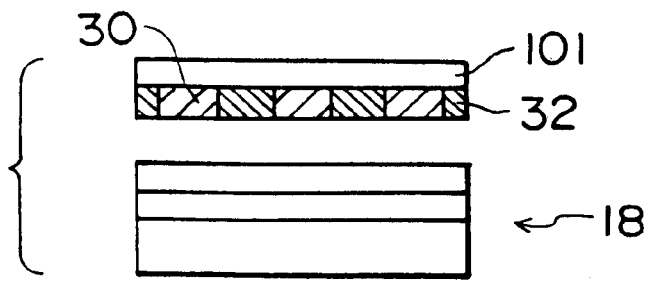

The formed color filter layers can be transferred onto a second substrate such as a glass or flexible plastic film 101 shown in FIG. 5F, when such a final product having only a substrate and a colored layer is desired. The transferring process; can be at least one of a pressure energy-utilized or a thermal energy-utilized transferring; process.

As illustrated in the previously mentioned FIG. 5(D), the color filter of the present invention prepared with the above-mentioned method is characterized in that a transparent electroconductive layer, a transparent organic or inorganic semiconductor layer, and a colored electrodeposition film layer formed from a coloring component and an electrodeposition material, which is chemically dissolved or precipitated/sedimented based on changes in the pH, are sequentially laminated on a transparent substrate. Pigments and dyes can be optionally used as the coloring material and hence, desired light resistance and hues can be selected. Because the surface of the color filter can be made smooth by controlling conditions for the formation of the electrodeposition film, a color filter having excellent smoothness can be formed simply and at low cost. The color filter of the present invention therefore has the advantage of a wide range of applications.

Also, because the color filter of the present invention includes a semiconductor film in a substrate and has high surface smoothness, it can be favorably used for such applications in which an electronic device is formed directly on the surface of the color filter.

In the specification of the present application, examples of the manufacturing of a filter comprising RGB and a black matrix are primarily described. However, by increasing or altering the coloring material and by using an electrodeposition material containing coloring materials of cyan, magenta, and yellow, a CMY color filter of each color may be formed. This color filter may be suitably used as a reflective type filter. In addition, the formation of color filters for three or more, six colors for example, is possible by combining an RGB filter. Incidentally, the black matrix may be formed either in a final stage or in a first stage. According to the manufacturing method of the present invention, the color filter can be produced in which the transparent substrate, the transparent electroconductive film, the organic or inorganic semiconductor film, and the transparent electrodeposition coloring material layer containing the coloring material and preferably provided with the black matrix and the RGB filter are laminated in that order. This color filter can be used as a color filter device as is, and also can be used by transferring only the transparent electrodeposition coloring material layer.

In the method for manufacturing the color filter in accordance with the present invention, the color filter layer is formed on a hard substrate using an electrochemical method. Therefore, even if any defect is found, a new layer can be formed on desired portions only by precipitation using a new mask pattern after the color filter layer of the fixed portions is removed. Thus defects can be repaired with ease.

Further, inferior products and the like can be produced over again because the formed filter can be easily removed and the substrate can be reused. Thus the method of the present invention also has advantages wherein the manufacturing yield is outstandingly improved and the occurrence of waste is reduced.

The present invention will be explained in more detail by way of examples, which are not intended to be limiting with respect to the present invention.

EXAMPLE 1

Figure 7:
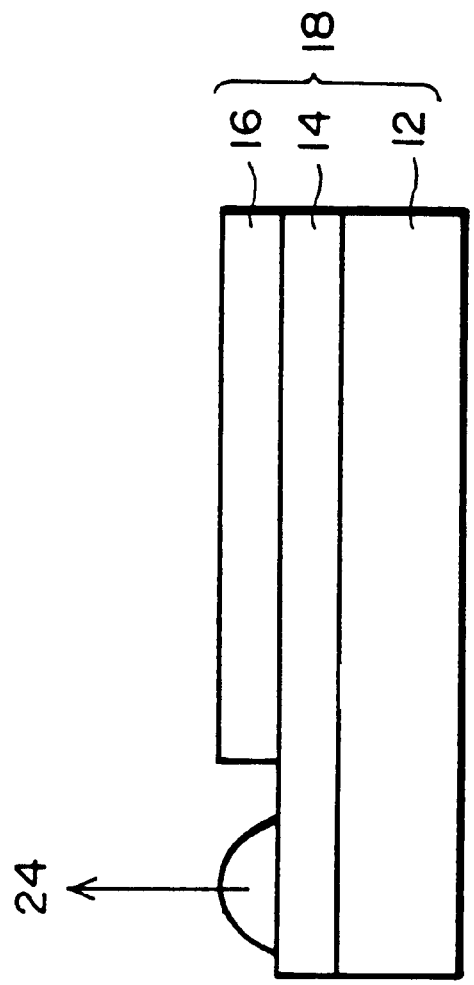
FIG. 7 is a schematic diagram showing the structure of a transparent n-type semiconductor which forms a substrate of a color filter.

As shown in FIG. 7, the transparent electroconductive film 14 of ITO with a thickness of 100 nm was formed on the glass substrate 12 having a thickness of 1 mm by sputtering and further, the $TiO_2$ 16 with a thickness of 250 nm was formed as a film on the transparent electroconductive film 14. A reduction process was then carried out to improve the photocurrent characteristic of the $TiO_2$ 16. The reduction process was performed by annealing at 350° C. for 10 minutes in pure nitrogen gas mixed with 3% of hydrogen gas. The annealed substrate was exposed in the aqueous solution 22 by using the apparatus with a triple-pole type arrangement, which is common in electrochemistry, as shown in FIG. 6. The solution 22 contained a pigment, in which a styrene-acrylic acid copolymer (molecular weight: 13,000, mol ratio of a hydrophobic group/(a hydrophilic group+a hydrophobic group): 65%, acid value: 150) as the electrodeposition material and an azo-type red ultra-microparticle pigment as the coloring material were dispersed at a ratio of 1:1 in terms of solid components. In the exposure process, the $TiO_2$ electrode 16 was utilized as the working electrode with respect to the saturated calomel electrode 25, the voltage of the working electrode was 1.7 V and light from a mercury xenon lamp (wavelength: 365 nm, intensity of light: 50 mW/cm$^2$, manufactured by Yamashita Denso Corporation) was applied to the substrate from the backface through the photomask 28 for 10 seconds. As a result, a red filter pattern was formed only on an area irradiated by light on the surface of the $TiO_2$ 16. This filter pattern was dried to carry out formation of a film with certainty.

Next, the resulting substrate was exposed in an aqueous solution containing a pigment in which a styrene-acrylic acid copolymer (molecular weight: 13,000, mol ratio of a hydrophobic group/(a hydrophilic group+a hydrophobic group): 65%, acid value: 150) and a phthalocyanine green-type ultra-microparticle pigment were dispersed at a ratio of 1:1 in terms of solid components. In the exposure process, the $TiO_2$ electrode was utilized as the working electrode against the saturated calomel electrode, the voltage of the working electrode was 1.7 V and light from a mercury xenon lamp (wavelength: 365 nm, intensity of light: 50 mW/cm$^2$, manufactured by Yamashita Denso Corporation) was applied to the substrate from the backspace through a photomask for 10 seconds. As a result, a green filter pattern was formed only on an area irradiated by light on the surface of the $TiO_2$.

In the same manner, the resulting substrate was exposed in an aqueous solution containing a pigment in which a styrene-acrylic acid copolymer (molecular weight: 13,000, mol ratio of a hydrophobic group/(a hydrophilic group+a hydrophobic group): 65%, acid value: 150) and a phthalocyanine blue-type ultra-microparticle pigment were dispersed at a ratio of 1:1 in terms of solid components. In the exposure process, the TiO$_2$ electrode was utilized as the working electrode with respect to the saturated calomel electrode, the voltage of the working electrode was 1.7 V and light from a mercury xenon lamp (wavelength: 365 nm, intensity of light: 50 mW/cm$^2$, manufactured by Yamashita Denso Corporation) was applied to the substrate from the backface through a photomask for 10 seconds. As a result, a blue filter pattern was formed only on an area irradiated by light on the surface of the TiO$_2$. A color filter layer was thus formed.

After the color filter layer was fixed, the substrate was washed with pure water. Thereafter, it was electrochemically treated in an aqueous solution containing a pigment in which a styrene-acrylic acid copolymer (molecular weight: 13,000, mol ratio of a hydrophobic group/(a hydrophilic group+a hydrophobic group): 65%, acid value: 150) and a carbon black powder (average particle diameter: 80 nm) were dispersed at a ratio of 1:1 in terms of solid components. In the process, the TiO$_2$ electrode was utilized as the working electrode with respect to the saturated calomel electrode and the voltage of the working electrode was 2.0 V when applying voltage. As a result, a thin film containing carbon black was formed only on an area on which the color filter layer had not been formed. A black matrix was thus formed. After washing, a protective layer was coated on the top of the substrate to obtain a color filter.

Observation of the surface of the color filter showed that it was very smooth and it was confirmed that the color filter could be used not only as a common color filter but also for the purpose of forming an electronic device directly thereon.

EXAMPLE 2

As shown in FIG. 7, a transparent electroconductive film of ITO with a thickness of 100 nm was formed on a glass substrate with a thickness of 1 mm by sputtering and in addition, TiO$_2$ with a thickness of 250 nm was formed as a film on the transparent electroconductive film. A reduction process was then carried out to improve the photocurrent characteristic of the TiO$_2$. The reduction process was performed by annealing at 350° C. for 10 minutes in pure nitrogen gas mixed with 3% of hydrogen gas. The annealed substrate was exposed in an aqueous solution using a triple-pole type arrangement, which is common in electrochemistry, in the same manner as in Example 1. The solution contained a pigment in which a styrene-acrylic acid copolymer (molecular weight: 13,000, mol ratio of a hydrophobic group/(a hydrophilic group+a hydrophobic group): 65%, acid value: 150) and an azo-type red ultra-microparticle pigment were dispersed at a ratio of 1:1 in terms of solid components. In the exposure process, the TiO2 electrode was utilized as the working electrode with respect to the saturated calomel electrode, the voltage of the working electrode was 1.7 V and light from a mercury xenon lamp (wavelength: 365 nm, intensity of light: 50 mW/cm$^2$, manufactured by Yamashita Denso Corporation) was applied to the substrate from the backface through a photomask for 10 seconds. As a result, a red filter pattern was formed only on an area irradiated by light on the surface of the TiO$_2$.

Next, the resulting substrate was exposed in an aqueous solution containing a pigment in which a styrene-acrylic acid copolymer (molecular weight: 13,000, mol ratio of a hydrophobic group/(a hydrophilic group+a hydrophobic group): 65%, acid value: 150) and a phthalocyanine green-type ultra-microparticle pigment were dispersed at a ratio of 1:1 in terms of solid components. In the exposure process, the TiO$_2$ electrode was utilized as the working electrode with respect to the saturated calomel electrode, the voltage of the working electrode was 1.7 V and light from a mercury xenon lamp (wavelength: 365 nm, intensity of light: 50 mW/cm$^2$, manufactured by Yamashita Denso Corporation) was applied to the substrate from the backface through a photomask for 10 seconds. As a result, a green filter pattern was formed only on an area irradiated by light on the surface of the TiO$_2$.

In the same manner, the resulting substrate was exposed in an aqueous solution containing a pigment in which the styrene-acrylic acid copolymer (molecular weight: 13,000, mol ratio of a hydrophobic group/(a hydrophilic group+a hydrophobic group): 65%, acid value: 150) and the phthalocyanine blue-type ultra-microparticle pigment were dispersed at a ratio of 1:1 in terms of solid components. In the exposure process, the TiO$_2$ electrode was utilized as the working electrode with respect to the saturated calomel electrode, the voltage of the working electrode was 1.7 V and light from a mercury xenon lamp (wavelength: 365 nm, intensity of light: 50 mW/cm$^2$), manufactured by Yamashita Denso Corporation) was applied to the substrate from a backface through a photomask for 10 seconds. As a result, a blue filter pattern was formed only on an area irradiated by light on the surface of the TiO$_2$. A color filter layer was thus formed.

After the formed color filter layers was washed with pure water, the substrate was exposed in an aqueous solution containing a pigment in which the styrene-acrylic acid copolymer (molecular weight: 13,000, mol ratio of a hydrophobic group/(a hydrophilic group+a hydrophobic group): 65%, acid value: 150) and a carbon black powder (average particle diameter: 80 nm) were dispersed at a ratio of 1:1 in terms of solid components. In the process, the TiO$_2$ electrode was utilized as the working electrode with respect to the saturated calomel electrode, the voltage of the working electrode was 1.6 V, and light from a mercury xenon lamp (wavelength: 365 nm, intensity of light: 50 mW/cm$^2$, manufactured by Yamashita Denso Corporation) was applied to the entire surface of the substrate from the backface for 10 seconds. As a result, a thin copolymer film containing carbon black was formed only on an area on which the color filter layer had not been formed. A black matrix was thus formed. After washing, a protective layer was coated on the top of the substrate to obtain a color filter.

In this example, the black matrix was obtained having the same excellent qualities as that prepared in Example 1, in which voltage was applied without radiation, although a method in which the entire surface was irradiated with light from the mercury xenon lamp was used for the formation of the black matrix.

EXAMPLE 3

As shown in FIG. 7, a transparent electroconductive film of ITO with a thickness of 100 nm was formed on a glass substrate having a thickness of 1 mm by sputtering and TiO$_2$ with a thickness of 250 nm was formed as a film on the ITO thin film using a sol/gel method. In the formation of the TiO$_2$ film, an alkoxide of TiO$_2$ (Atoron Nti-092, manufactured by Nippon Soda Co., Ltd.) was formed as a film on the ITO substrate by carrying out a coating operation at a rotation of 1500 rpm for 20 seconds according to a spin coating method, followed by heating at about 500° C. for one hour. A reduction process was performed by annealing at 350° C. for 10 minutes in pure nitrogen gas mixed with 3% of hydrogen gas in the same manner as in Example 1. As shown in FIG.

6, the annealed substrate was exposed in an aqueous solution using a triple-pole type arrangement, which is common in electrochemistry, and which is of the same kind used in Example 1. The solution contained a pigment in which a styrene-acrylic acid copolymer (molecular weight: 13,000, mol ratio of a hydrophobic group/(a hydrophilic group+a hydrophobic group): 65%, acid value: 150) and an azo-type red ultra-microparticle pigment were dispersed at a ratio of 1:1 in terms of solid components. In the exposure process, the $TiO_2$ electrode was utilized as the working electrode with respect to the saturated calomel electrode, the voltage of the working electrode was 1.7 V and light from a mercury xenon lamp (wavelength: 365 nm, intensity of light: 50 mW/cm$^2$, manufactured by Yamashita Denso Corporation) was applied to the substrate from the backface through a photomask for 10 seconds. As a result, a red filter pattern was formed only on the areas, irradiated by light, on the surface of the $TiO_2$. Next, the resulting substrate was exposed in an aqueous solution containing a pigment in which a styrene-acrylic acid copolymer (molecular weight: 13,000, mol ratio of a hydrophobic group/(a hydrophilic group+a hydrophobic group): 65%, acid value: 150) and a phthalocyanine green-type ultra-microparticle pigment were dispersed at a ratio of 1:1 in terms of solid components. In the exposure process, the $TiO_2$ electrode was utilized as the working electrode with respect to the saturated calomel electrode, the voltage of the working electrode was 1.7 V and light from a mercury xenon lamp (wavelength: 365 nm, intensity of light: 50 mW/cm$^2$, manufactured by Yamashita Denso Corporation) was applied to the substrate from the backface through a photomask for 10 seconds. As a result, a green filter pattern was formed only on areas, irradiated by light on the surface of the $TiO_2$. In the same manner, the resulting substrate was exposed in an aqueous solution containing a pigment in which a styrene-acrylic acid copolymer (molecular weight: 13,000, mol ratio of a hydrophobic group/(a hydrophilic group+a hydrophobic group): 65%, acid value: 150) and a phthalocyanine blue-type ultra-microparticle pigment were dispersed at a ratio of 1:1 in terms of solid components. In the exposure process, the $TiO_2$ electrode was utilized as the working electrode with respect to the saturated calomel electrode, the voltage of the working electrode was 1.7 V and light from a mercury xenon lamp (wavelength: 365 nm, intensity of light: 50 mW/cm$^2$, manufactured by Yamashita Denso Corporation) was applied to the substrate from the backface through a photomask for 10 seconds. As a result, a blue filter pattern was formed only on an area irradiated by light on the surface of the $TiO_2$. A color filter layer was thus formed. Next, the formed color filter layer was washed with pure water. Thereafter, the substrate was exposed in an aqueous solution containing a pigment in which a styrene-acrylic acid copolymer (molecular weight: 13,000, mol ratio of a hydrophobic group/(a hydrophilic group+a hydrophobic group): 65%, acid value: 150) and a carbon black powder (average particle diameter: 80 nm) were dispersed at a ratio of 1:1 in terms of solid components. In the process, the $TiO_2$ electrode was utilized as the working electrode with respect to the saturated calomel electrode, the voltage of the working electrode was 1.6 V, and light from a mercury xenon lamp (wavelength: 365 nm, intensity of light: 50 mW/cm$^2$, manufactured by Yamashita Denso Corporation) was applied to the entire surface of the substrate from the backface, for 10 seconds. As a result, a thin copolymer film containing carbon black was formed only on an area on which the color filter layer had not been formed. A black matrix was thus formed. After washing, a protective layer was coated on the top of the substrate to obtain a color filter.

In this example, a good color filter was obtained, as in the case of forming a film using a sputtering method, although the $TiO_2$ was formed as a film using a sol/gel method.

EXAMPLE 4

As shown in FIG. 7, a transparent electroconductive film of ITO with a thickness of 100 nm was formed on a glass substrate having a thickness of 1 mm by sputtering and $TiO_2$ with a thickness of 250 nm was filmed on the ITO thin film using a sol/gel method. In the formation of the $TiO_2$ film, an alkoxide of $TiO_2$ (Atoron Nti-092, manufactured by Nippon Soda Co., Ltd.) was formed as a film on the ITO substrate by carrying out a coating operation at eL rotation of 1500 rpm for 20 seconds according to a spin coating method, followed by heating at about 500° C. for one hour. A reduction process was performed by annealing at 350° C. for 10 minutes in pure nitrogen gas mixed with 3% of hydrogen gas in the same manner as in Example 1. The annealed substrate was exposed in an aqueous solution using a triple-pole type arrangement, which is common in electrochemistry as shown in FIG. 6. The solution contained a pigment in which a styrene-acrylic acid copolymer (molecular weight: 13,000, mol ratio of a hydrophobic group/(a hydrophilic group+a hydrophobic group): 65%, acid value: 150) and an azo-type red ultra-microparticle pigment were dispersed at a ratio of 1:1 in terms of solid components. In the exposure process, the $TiO_2$ electrode was utilized as the working electrode with respect to the saturated calomel electrode, the voltage of the working electrode was 1.7 V and light from a mercury xenon lamp (wavelength: 365 nm, intensity of light: 50 mW/cm$^2$, manufactured by Yamashita Denso Corporation) was applied to the substrate from the backface through a photomask for 10 seconds. As a result, a red filter pattern was formed only on an area irradiated by light on the surface of the $TiO_2$. Next, the resulting substrate was exposed in an aqueous solution containing a pigment in which a styrene-acrylic acid copolymer (molecular weight: 13,000, mol ratio of a hydrophobic group/(a hydrophilic group+a hydrophobic group): 65%, acid value: 150) and a phthalocyanine green-type ultra-microparticle pigment were dispersed at a ratio of 1:1 in terms of solid components. In the exposure process, the $TiO_2$ electrode was utilized as the working electrode with respect to the saturated calomel electrode, the voltage of the working electrode was 1.7 V and light from a mercury xenon lamp (wavelength: 365 nm, intensity of light: 50 mW/cm$^2$, manufactured by Yamashita Denso Corporation) was applied to the substrate from the backface through a photomask for 10 seconds. As a result, a green filter pattern was formed only on an area irradiated by light on the surface of the $TiO_2$. In the same manner, the resulting substrate was exposed in an aqueous solution containing a pigment in which a styrene-acrylic acid copolymer (molecular weight: 13,000, mol ratio of a hydrophobic group/(a hydrophilic group+a hydrophobic group): 65%, acid value: 150) and a phthalocyanine blue-type ultra-microparticle pigment were dispersed at a ratio of 1:1 in terms of solid components. In the exposure process, the $TiO_2$ electrode was utilized as the working electrode with respect to the saturated calomel electrode, the voltage of the working electrode was 1.7 V and light from a mercury xenon lamp (wavelength: 365 nm, intensity of light: 50 mW/cm$^2$, manufactured by Yamashita Denso Corporation) was applied to the substrate from the backface through a photomask for 10 seconds. As a result, a blue filter pattern was formed only on an area irradiated by light on the surface of $TiO_2$. A color filter layer was thus formed.

Next, the formed color filter layer was washed with pure water and was then brought into contact with a UV-ray curable resin solution in which a carbon black powder (average particle diameter: 80 nm) was dispersed. Thereafter, UV-rays were applied to the substrate from the backface. As a result, a thin cured resin film of carbon black was formed only on an area on which the color filter layer had not been formed. A black matrix was thus formed. After washing, a protective layer was coated on the top of the substrate to obtain a color filter.

In this example, a black matrix was formed that was excellent like those in the aforementioned examples which use the electrodeposition material although a UV-ray curable resin solution was used for the formation of the black matrix.

EXAMPLE 5

AS shown in FIG. 7, a transparent electroconductive film of ITO with a thickness of 100 nm was formed on a glass substrate with a thickness of 1 mm by sputtering and $TiO_2$ with a thickness of 250 nm was filmed or. the ITO thin film using a sol/gel method. In the formation of the $TiO_2$ film, an alkoxide of $TiO_2$ (Atoron Nti-092, manufactured by Nippon Soda Co., Ltd.) was formed as a film on the ITO substrate by carrying out a coating operation at a rotation of 1500 rpm for 20 seconds according to a spin coating method, followed by heating at about 500° C. for one hour. A reduction process was performed by annealing at 350° C. for 10 minutes in pure nitrogen gas mixed with 3% of hydrogen gas in the same manner as in Example 1. As shown in FIG. 6, the annealed substrate was exposed in an aqueous solution containing an azo-type red dye using a triple-pole type arrangement, which is common in electrochemistry. In the exposure process, the $TiO_2$ electrode was utilized as the working electrode with respect to the saturated calomel electrode, the voltage of the working electrode was 2.0 V and light from a mercury xenon lamp (wavelength: 365 nm, intensity of light: 50 mW/cm$^2$, manufactured by Yamashita Denso Corporation) was applied to the substrate from the backface through a photomask for 10 seconds. As a result, a red filter pattern was formed only on an area irradiated by light on the surface of the $TiO_2$. Next, the resulting substrate was exposed in an aqueous solution containing a dye in which a styrene-acrylic acid copolymer (molecular weight: 13,000, mol ratio of a hydrophobic group/(a hydrophilic group+a hydrophobic group): 65%, acid value: 150) and Cathilon Pure Blue 5GH were dispersed at a ratio of 1:1 in terms of solid components. In the exposure process, the $TiO_2$ electrode was utilized as the working electrode against the saturated calomel electrode, the voltage of the working electrode was 2.0 V and light from a mercury xenon lamp (wavelength: 365 nm, intensity of light: 50 mW/cm$^2$, manufactured by Yamashita Denso Corporation) was applied to the substrate from the backface through a photomask for 10 seconds. As a result, a blue filter pattern was formed only on an area irradiated by light on the surface of the $TiO_2$. In the same manner, the resulting substrate was exposed in an aqueous solution in which 0.01 M of Pro Jet Fast Yellow 2 and 0.01 M of Cathilon Pure Blue 5GH were mixed. In the exposure process, the $TiO_2$ electrode was utilized as the working electrode against the saturated calomel electrode, the voltage of the working electrode was 2.0 V and light from a mercury xenon lamp (wavelength: 365 nm, intensity of light: 50 mW/cm$^2$, manufactured by Yamashita Denso Corporation) was applied to the substrate from the backface through a photomask for 10 seconds. As a result, a green filter pattern was formed only on an area irradiated by light on the surface of the $TiO_2$. A color filter layer was thus formed. Next, the substrate was washed with pure water, and was exposed in an aqueous solution containing a pigment in which a styrene-acrylic acid copolymer (molecular weight: 13,000, mol ratio of a hydrophobic group/(a hydrophilic group+a hydrophobic group): 65%, acid value: 150) and a carbon black powder (average particle diameter: 80 nm) were dispersed at a ratio of 1:1 in terms of solid components. In the process, the $TiO_2$ electrode was utilized as the working electrode with respect to the saturated calomel electrode, the voltage of the working electrode was 1.6 V, and light from a mercury xenon lamp (wavelength: 365 nm, intensity of light: 50 mW/cm$^2$, manufactured by Yamashita Denso Corporation) was applied to the entire surface of the substrate from the backface for 10 seconds. As a result, a thin film of carbon black covered only an area on which the color filter layer had not been formed. A black matrix was thus formed. After washing, a protective layer was coated on the top of the substrate to obtain a color filter.

In this example, dyes capable of forming an electrodeposition film were used as the electrodeposition material to form red and green filter patterns. In this case as well, a color filter was obtained that was excellent like those in the above examples in which the polymer electrodeposition material and the coloring material were jointly used.

EXAMPLE 6

On a substrate, exposure was carried out on a $TiO_2$ film, corresponding to a black matrix pattern, to form a black matrix first. In succession, color filter patterns of each of a red color, green color, and blue color were formed on an area, on which the black matrix had not been formed, under the same conditions as in Example 4, by altering the electrolyte and the exposure pattern. After washing, a protective layer was coated on the top of the substrate to obtain a color filter.

In the present example, a color filter was obtained that was excellent like that of Example 4, although the black matrix was first formed on the substrate and then each color filter pattern was formed.

EXAMPLE 7

The color filter substrate formed by Example 6 was cleaned with a solvent, then a second glass substrate was placed onto the substrate so that the color filter patterns on the substrate were contacted to the second substrate. Then, the two substrates were pressed against each other with a pressure of 200 g/cm$^2$ and kept in an oven for 10 minutes at 190° C. The substrate was removed from the surface of the second substrate so that the color filter patterns were transferred onto the surface of the second substrata. A passivation film was formed on the surface of the transferred color filter patterns.

EXAMPLE 8

The color filter substrate formed by Example 6 was cleaned with a solvent, then a polyamide film was placed onto the substrate so that the color filter patterns on the substrate were contacted to the polyimide film. The substrate and the polyimide film were passed between two rotating heat rollers heated to 140° C. at a process speed of 20 mm/sec, so that the two substrates are pressed against each other with 700 g/cm$^2$ linear pressure. The substrate was removed form the polyimide film surface so that the color filter patterns were transferred on to the polyimide film. A passivation film was formed onto the color filter pattern after the polyimide film was cleaned with a solvent.

EXAMPLE 9

A PET film with an ITO layer and a 125 μm thickness (Tokyo Oike Kogyo Co., Ltd.) was washed with deionized water and exposed to ozone for 15 minutes using an ozone cleaner (Nippon Laser Denshi Co., Ltd.). Then the surface of the ITO layer was coated with a coating liquid dispersing anataze-type titanium dioxide crystal particles therein (Nippon Soda Co., Ltd.) by using a dip coater. The PET film was heated at 60° C. for 30 minutes so that a titanium oxide layer was formed on the ITO layer surface. The titanium oxide layer formed on the surface of the PET film other than on the ITO layer was dropped off from the surface of the PET film. By using this substrate, the color filter pattern was formed on the substrate by using the same method as in Example 1. The formed color filter pattern had more than 80 percent transparency and also a highly smooth surface.

According to the method for manufacturing a color filter of the present invention, a color filter having high resolution and excellent controllability and smoothness can be formed with a small number of steps and at low cost without using a photolithographic process. Particularly, the method imparts various effects wherein a fine and complicated pixel arrangement can be coped with and the black matrix can be easily formed, making possible mass production. In according with the apparatus used in the method for manufacturing the color filter, a color filter which can cope with a complicated pixel arrangement and which has a simple structure can be formed.

The color filter of the present invention can cope with a fine and complicated pixel arrangement, has excellent surface smoothness, and is provided with a transparent semiconductor film within the filter and hence has a wide range of applications.

What is claimed is:

1. The method for manufacturing a color filter, comprising the steps of:
   a preparing a substrate produced by forming an organic semiconductor film or an inorganic semiconductor film on a transparent electroconductive film formed on a transparent substrate;
   b) preparing a water-based liquid in a vessel that can hold a liquid, the water based liquid containing a coloring material and an electrodeposition material that is chemically dissolved or precipitated/sedimented based on changes in the pH;
   c) disposing, in said vessel, an apparatus including a counter electrode which is the other of a pair of electrodes and securing said substrate, in which means for providing a current or an electric field is connected to said transparent electroconductive film, such that a semiconductor thin film is dipped in said water-based liquid; and
   d) applying light on the transparent substrate of said substrate to selectively precipitate an electrodeposition film which contains the electrodeposition material on a point at which electromotive force was generated with light irradiation, thereby forming a monochromatic color filter.

2. The method for manufacturing a color filter according to claim 1, further comprising using a plurality of coloring materials each having a different hue, and repeating the steps a)-d) for each coloring material having a different hue to form a polychromatic color filter.

3. The method for manufacturing a color filter comprising:
   forming a polychromatic color filter in accordance with claim 2;
   then containing a coloring material that can form a black matrix as said electrodeposition material and applying a voltage to form a black matrix of an electrodeposition film at a portion on which electrodeposition films each having a different color, and together constituting the color filters have not been formed.

4. The method for manufacturing a color filter according to claim 3, wherein a highly insulating material is used as said electrodeposition material and a black matrix electrodeposition film is selectively formed only on the area on which the color filter has not been formed utilizing the insulating properties of the surface of the color filter.

5. The method for manufacturing a color filter, comprising:
   forming a polychromatic color filler in accordance with claim 2;
   then containing a coloring material capable of forming a black matrix as said electrodeposition material and carrying out energizing out while irradiating the entire surface of said substrate with light to form a black matrix of an electrodeposition film at a portion on which electrodeposition films each having a different colors and together constituting the color filter, have not been formed.

6. The method for manufacturing a color filter according to claim 1, wherein said semiconductor thin film formed on said substrate includes an n-type semiconductor, and a compound having a carboxyl group in its molecule is used as said electrodeposition material.

7. The method for manufacturing a color filter according to claim 6, wherein titanium oxide is used as said n-type semiconductor.

8. The method for manufacturing a color filter according to claim 1, wherein said semiconductor thin film formed on said substrate includes a semiconductor having one of (a) a pn junction produced by sequentially laminating an n-type semiconductor and a p-type semiconductor, and (b) a pin junction produced by sequentially laminating an n-type semiconductor, an i-type semiconductor, and a p-type semiconductor, and a compound having a carboxyl group in its molecule is used as said electrodeposition material.

9. The method for manufacturing a color filter according to claim 1, wherein said semiconductor thin film formed on said substrate includes with a p-type semiconductor, and a compound having an amino group or an imino group in its molecule is used as said electrodeposition material.

10. The method for manufacturing a color filter according to claim 1, wherein said semiconductor thin film formed on said substrate includes a semiconductor having one of (a) a pn junction produced by sequentially laminating a p-type semiconductor and an n-type semiconductor, and (b) a pin junction produced by sequentially laminating a p-type semiconductor, an i-type semiconductor, and an n-type semiconductor, and a compound having an amino group or an imino group in its molecule is used as said electrodeposition material.

11. The method for manufacturing a color filter according to claim 1, wherein said electrodeposition material is formed with a dye having a carboxyl group in its molecule or a mixture thereof, and has a characteristic wherein the solubility varies as the pH varies.

12. The method for manufacturing a color filter according to claim 1, wherein said electrodeposition material contains coloring material microparticles and a copolymer which has an acid value of from 30 to 600 and which has a hydrophobic group and a hydrophilic group in its molecule, wherein the ratio of the number of hydrophobic groups to the total number of hydrophobic groups and hydrophilic groups of monomer units constituting said polymer is in a range from 40 to 80%, and 50% or more of the hydrophilic groups reversibly change from a hydrophilic group to a hydrophobic group with a change in the pH.

13. The method for manufacturing a color filter according to claim 1, wherein said electrodeposition material contains a compound having in a molecule a coloring material unit and a unit, which is precipitated/deposited by a change in pH.

14. The method for manufacturing a color filter according to claim 1, wherein an acidic or alkaline substance that does not affect the electrodeposition properties is added in said water-based liquid containing said electrodeposition material to control the pH of the water-based liquid thereby making the formation of an electrodeposition film possible even with a voltage of 5 V or less being applied.

15. The method for manufacturing a color filter according to claim 1, wherein the precipitation of said electrodeposition film is carried out under conditions wherein the potential of said means for providing a current or an electric field is 5 V or less based on the potential of a standard electrode when a saturated calomel standard electrode is electrically connected to said water-based liquid through a salt bridge.

16. The method for manufacturing a color filter according to claim 1, wherein a coloring material that can form a black matrix is contained as said electrodeposition material and further comprising after the black matrix is formed, the step of forming a monochromatic color filter repeatedly a plurality of times.

17. A color filter produced by the method for manufacturing a color filter according to claim 1.

18. The method for manufacturing a color filter, comprising the steps of:
preparing a substrate produced by forming an organic semiconductor film or an inorganic semiconductor film on a transparent electroconductive film formed on a transparent substrate;
preparing a water-based liquid in a vessel that can hold a liquid, the water-based liquid containing a coloring material and an electrodeposition material that is chemically dissolved or precipitated/sedimented based on changes in the pH;
disposing, in said vessel, an apparatus having a counter electrode which is the other of a pair of electrodes and securing said substrate, in which means for providing a current or an electric field according to at least an image pattern is connected to said transparent electroconductive film, such that a semiconductor thin film is dipped in said water-based liquid; and
applying light on the transparent substrate of said substrate to selectively precipitate an electrodeposition film which contains the electrodeposition material on a portion at which electromotive force was generated with light irradiation, thereby forming a monochromatic color filter.

19. The method for manufacturing a color filters, comprising the steps of:
preparing a substrate produced by forming an organic semiconductor film or an inorganic semiconductor film on a transparent electroconductive film formed on a transparent substrate;
preparing a water-based liquid in a vessel that can hold a liquid, the water-based liquid containing a coloring material and an electrodeposition material that is chemically dissolved or precipitated/sedimented based on changes in the pH;
disposing, in said vessel, an apparatus having a counter electrode which is the other of a pair of electrodes and securing said substrate such that a semiconductor thin film is dipped in said water-based liquid; and
applying light on the transparent substrate of said substrate while optionally applying bias voltage to said transparent electrodeposition film to selectively precipitate an electrodeposition film which contains the electrodeposition material on a portion at which electromotive force was generated with light irradiation, thereby forming a monochromatic color filter.

20. A color filters, comprising:
a transparent electroconductive layer; and
a transparent organic semiconductor layer or an inorganic semiconductor layer and a colored electrodeposition film layer formed of electrodeposition materials containing a coloring material and a polymer that is chemically dissolved or precipitated/sedimented based on changes in the pH, which are sequentially laminated on a transparent substrate.

21. The color filter according to claim 20, wherein said colored electrodeposition film layer comprises colored electrodeposition films respectively having red, green, and blue hues.

22. The color filter according to claim 20, further comprising a black matrix.

23. The color filter according to claim 20, wherein said polymer constituting said colored electrodeposition film is a copolymer that has an acid value of from 30 to 600 and includes a hydrophobic group and a hydrophilic group, wherein the ratio of the number of hydrophobic groups to the total number of hydrophilic groups and hydrophobic groups of a monomer units constituting the polymer is in a range from 40% to 80%, and 50% or more of the hydrophilic groups reversibly change from a hydrophilic group to a hydrophobic group with a change in the pH.

24. The method for manufacturing a color filter, comprising the steps of:
preparing a substrate having an organic or an inorganic semiconductor film on a transparent electrode formed on a transparent substrate;
preparing a water-based liquid containing a coloring material and an electrodeposition material that is dissolved or precipitated based on variations of pH values of the water-based liquid;
disposing a counter electrode with the semiconductor film in the water-based liquid and providing an electric current or electric field therebetween; and
exposing the substrate to light to generate a photo electromotive force to change the pH value of the water-based liquid adjacent to the semiconductor film, thereby precipitating the electrodeposition material.

25. The method for manufacturing a color filter according to claim 24, further comprising the step of transferring the precipitated electrodeposition material to a second substrate.

* * * * *